(12) United States Patent
Oyobe et al.

(10) Patent No.: US 8,054,025 B2
(45) Date of Patent: Nov. 8, 2011

(54) CHARGE CONTROL DEVICE AND ELECTRICALLY DRIVEN VEHICLE

(75) Inventors: Hichirosai Oyobe, Toyota (JP);
Tetsuhiro Ishikawa, Nishikamo-gun (JP); Makoto Nakamura, Okazaki (JP); Yukihiro Minezawa, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 856 days.

(21) Appl. No.: 11/990,008

(22) PCT Filed: Aug. 30, 2006

(86) PCT No.: PCT/JP2006/317602
§ 371 (c)(1),
(2), (4) Date: Feb. 5, 2008

(87) PCT Pub. No.: WO2007/026942
PCT Pub. Date: Mar. 8, 2007

(65) Prior Publication Data
US 2010/0019734 A1 Jan. 28, 2010

(30) Foreign Application Priority Data
Sep. 1, 2005 (JP) .................... 2005-253841

(51) Int. Cl.
*H02P 1/00* (2006.01)
*B60K 6/20* (2007.10)
*B60W 20/00* (2006.01)
*H02J 7/00* (2006.01)
(52) U.S. Cl. ........... 318/441; 318/442; 180/65.21; 180/65.29; 320/137
(58) Field of Classification Search .......... 903/903, 903/907; 180/65.21–65.51; 318/139, 440, 318/441, 442; 320/104, 137
See application file for complete search history.

(56) References Cited

U.S. PATENT DOCUMENTS

| | | | | |
|---|---|---|---|---|
| 5,099,186 A | * | 3/1992 | Rippel et al. | 318/803 |
| 5,642,270 A | * | 6/1997 | Green et al. | 363/17 |
| 5,661,390 A | * | 8/1997 | Lipo et al. | 318/803 |
| 7,265,455 B2 | * | 9/2007 | Oyobe et al. | 290/1 R |
| 7,276,865 B2 | * | 10/2007 | Ochiai | 318/34 |
| 7,362,597 B2 | * | 4/2008 | Ishikawa et al. | 363/71 |
| 7,486,035 B2 | * | 2/2009 | Oyobe et al. | 318/149 |
| 7,486,036 B2 | * | 2/2009 | Oyobe et al. | 318/376 |
| 7,688,604 B2 | * | 3/2010 | Oyobe et al. | 363/40 |
| 7,755,306 B2 | * | 7/2010 | Oyobe et al. | 318/98 |
| 7,764,051 B2 | * | 7/2010 | Ishikawa et al. | 322/29 |
| 7,847,521 B2 | * | 12/2010 | Iida | 320/138 |

(Continued)

FOREIGN PATENT DOCUMENTS

| | | |
|---|---|---|
| JP | A-4-295202 | 10/1992 |
| JP | A-8-126121 | 5/1996 |
| JP | 8-214592 | 8/1996 |

(Continued)

*Primary Examiner* — Richard V Muralidar
(74) *Attorney, Agent, or Firm* — Oliff & Berridge, PLC (57) ABSTRACT

Commercial AC voltage applied to an input terminal (90) from a commercial power supply external to the vehicle is boosted by a transformer (86) to a voltage level higher than the voltage (VB) of an electricity storage device (B) to be applied to neutral points (N1, N2). In a charging mode of the electricity storage device (B) from a commercial power supply, all npn transistors of an inverter (20, 30) are turned off. The AC voltage applied to the neutral points (N1, N2) is rectified by an anti-parallel diode of the inverter (20, 30) to be supplied onto a power supply line (PL2). A boost converter (10) controls the charging current from the power supply line (PL2) towards the electricity storage device (B).

9 Claims, 6 Drawing Sheets

U.S. PATENT DOCUMENTS

| | | | |
|---|---|---|---|
| 7,859,201 B2 * | 12/2010 | Oyobe et al. | 318/105 |
| 7,886,857 B2 * | 2/2011 | Fujitake | 180/65.29 |
| 2004/0017176 A1 * | 1/2004 | Fromme et al. | 320/104 |
| 2006/0113798 A1 * | 6/2006 | Oyobe et al. | 290/7 |

FOREIGN PATENT DOCUMENTS

| | | |
|---|---|---|
| JP | A-9-322412 | 12/1997 |
| JP | A-10-117445 | 5/1998 |
| RU | 2 124 260 C1 | 12/1998 |

* cited by examiner

CHARGE CONTROL DEVICE AND ELECTRICALLY DRIVEN VEHICLE

TECHNICAL FIELD

The present invention relates to a charge control device and an electrically driven vehicle. Particularly, the present invention relates to a charge control device for an electricity storage device incorporated in an electrically driven vehicle such as electric vehicles and hybrid vehicles.

BACKGROUND ART

Japanese Patent Laying-Open No. 4-295202 discloses an electric motor drive and power processing apparatus employed in an electrically driven vehicle. This electric motor drive and power processing apparatus includes a secondary battery, inverters IA and IB, induction motors MA and MB, and a control unit. Induction motors MA and MB include Y-connected windings CA and CB, respectively. Input/output ports are connected to neutral points NA and NB of windings CA and CB via an EMI filter.

Inverters IA and IB are provided corresponding to induction motors MA and MB, respectively, and connected to windings CA and CB, respectively. Inverters IA and IB are connected in parallel with the secondary battery.

In this electric motor drive and power processing apparatus, AC power is supplied across neutral points NA and NB of windings CA and CB via an EMI filter from a single phase power supply connected to the input/output port, when operating in a recharging mode, and inverters IA and IB convert the AC power supplied across neutral points NA and NB into DC power for charging the DC power supply.

The electric motor drive and power processing apparatus disclosed in Japanese Patent Laying-Open No. 4-295202 is advantageous in that an additional AC/DC converter to charge the DC power supply is not required, but disadvantageous in that switching loss of inverters IA and IB occurs when the AC voltage supplied from the single phase power supply connected to the input/output port is converted into DC voltage according to the voltage level of the DC power supply.

Further, switching control of inverters IA and IB may become complicated since the AC voltage applied across neutral points NA and NB of windings CA and CB is converted into DC voltage according to the voltage level of the DC power supply by inverters IA and IB.

DISCLOSURE OF THE INVENTION

In view of the foregoing, an object of the present invention is to provide a charge control device without having to incorporate an additional dedicated converter to charge an electricity storage device from an external power supply, and eliminating the need of a switching operation of the inverter.

Another object of the present invention is to provide an electrically driven vehicle without having to incorporate an additional dedicated converter to charge an electricity storage device from a power supply external to the vehicle, and eliminating the need of a switching operation of the inverter when charging from the power supply external to the vehicle.

A charge control device according to the present invention is directed to a charge control device to charge an electricity storage device, and includes a first polyphase winding that is star-connected, a second polyphase winding that is star-connected, first and second inverters connected to the first and second polyphase windings, respectively, and including an anti-parallel diode connected in parallel with each switching element, a converter arranged between each of the first and second inverters and the electricity storage device, and a boosting device arranged between each of a first neutral point of the first polyphase winding and a second neutral point of the second polyphase winding and a power supply, boosting voltage supplied from the power supply to a voltage level higher than the voltage of the electricity storage device to provide the boosted voltage to the first and second neutral points. The first and second inverters output the voltage boosted and provided to the first and second neutral points by the boosting device to the converter via the anti-parallel diode. The converter charges the electricity storage device while controlling the charging current of the electricity storage device based on a state of charge of the electricity storage device.

In the charge control device of the present invention, electric power from the power supply is supplied to the first neutral point of the first polyphase winding and the second neutral point of the second polyphase winding to effect charging of the electricity storage device via the first and second inverters and the converter. Since the boosting device boosts the voltage supplied from the power supply to a voltage level higher than the voltage of the electricity storage device and provides the boosted voltage to the first and second neutral points, the first and second inverters can supply the voltage applied at the first and second neutral points to the converter via the anti-parallel diode without having to operate each switching element. Current control of the electricity storage device is effected through the converter.

According to the charge control device of the present invention, loss in charging can be reduced since switching of the first and second inverters is not required. Further, control during charging is facilitated since switching-control of the first and second inverters is not required.

Preferably, the voltage supplied from the power supply is AC voltage. The boosting device includes a transformer boosting the AC voltage supplied from the power supply. The first and second inverters use the anti-parallel diode to rectify the AC voltage boosted and applied to the first and second neutral points by the transformer for output to the converter.

Since the boosting device is constituted of a transformer in the charge control device, the secondary side of the transformer is insulated from the primary side. According to the charge control device, the first and second inverters, the converter, and the electricity storage device can be insulated from the power supply.

Further preferably, the power supply is AC power supply for commercial use.

According to the charge control device, the electricity storage device can be charged readily and safely using the AC power supply for commercial use such as at home.

Preferably, the first and second polyphase windings are included in first and second electric motors, respectively, as stator windings. The first and second electric motors, the electricity storage device, the converter, the first and second inverters, and the secondary winding of the transformer are incorporated in an electrically driven vehicle with at least one of first and second electric motors as the motive power source.

In the charge control device, the secondary winding of the transformer is incorporated in the electrically driven vehicle whereas the primary winding of the transformer is provided external to the vehicle. According to the charge control device, the electricity storage device of the electrically driven vehicle can be charged in a non-contact manner from a power supply external to the vehicle.

According to the present invention, an electrically driven vehicle includes a electricity storage device, a first electric motor having a first polyphase winding that is star-connected as a stator winding, a second electric motor having a second polyphase winding that is star-connected as a stator winding, first and second inverters provided corresponding to the first and second electric motors, respectively, and having an anti-parallel diode connected in parallel with each switching element, a converter arranged between each of the first and second inverters and the electricity storage device, and a boosting device arranged between each of a first neutral point of the first polyphase winding and a second neutral point of the second polyphase winding and a power supply external to the vehicle, boosting voltage supplied from the power supply to a voltage level higher than the voltage of the electricity storage device to provide the boosted voltage to the first and second neutral points. When charging of the electricity storage device is effected from the power supply, the first and second inverters output the voltage boosted and applied to the first and second neutral points by the boosting device to the converter via the anti-parallel diode, and the converter charges the electricity storage device while controlling the charging current of the electricity storage device based on the state of charge of the electricity storage device.

According to the electrically driven vehicle of the present invention, electric power is supplied from a power supply external to the vehicle to the first neutral point of the first electric motor and the second neutral point of the second electric motor, and charging of the electricity storage device is effected via the first and second inverters and converter. Since the boosting device boosts the voltage supplied from the power supply to a voltage level higher than the voltage of the electricity storage device for provision to the first and second neutral points, the first and second inverters can supply the voltage applied to the first and second neutral points to the converter via the anti-parallel diode without having to operate each switching element. Current control of the electricity storage device is effected through the converter.

According to the electrically driven vehicle of the present invention, the electricity storage device can be charged from a power supply external to the vehicle without a dedicated converter for charging. Since switching of the first and second inverters is not required during charging, the loss in charging can be reduced. Further, control during charging is facilitated since switching-control of the first and second inverters is not required.

Preferably, the voltage supplied from the power supply is AC voltage. The boosting device includes a transformer boosting the AC voltage supplied from the power supply. The first and second inverters use the anti-parallel diode to rectify the AC voltage boosted and applied to the first and second neutral points by the transformer for output to the converter.

Since the boosting device is constituted of a transformer in the electrically driven vehicle, the secondary side of the transformer is insulated from the primary side. According to the electrically driven vehicle, the first and second inverters, the converter, and the electricity storage device can be insulated from the power supply.

Further preferably, the power supply is AC power supply for commercial use.

According to the electrically driven vehicle, the electricity storage device can be charged readily and safely using the commercial AC power supply such as at home.

Since the voltage from a power supply is boosted to a voltage level higher than the voltage of the electricity storage device by the boosting device in the present invention to be supplied to the first and second neutral points, switching operation of the first and second inverters can be eliminated. Therefore, the loss in charging can be reduced. Further, control during charging is facilitated.

By employing a transformer for the boosting device, the first and second inverters, the converter, and the electricity storage device can be insulated from the power supply. Further, the electricity storage device can be charged from an external power supply in a non-contact manner.

BEST MODE FOR CARRYING OUT THE INVENTION

An embodiment of the present invention will be described hereinafter in detail with reference to the drawings. In the drawings, the same or corresponding elements have the same reference characters allotted, and description thereof will not be repeated.

Figure 1:
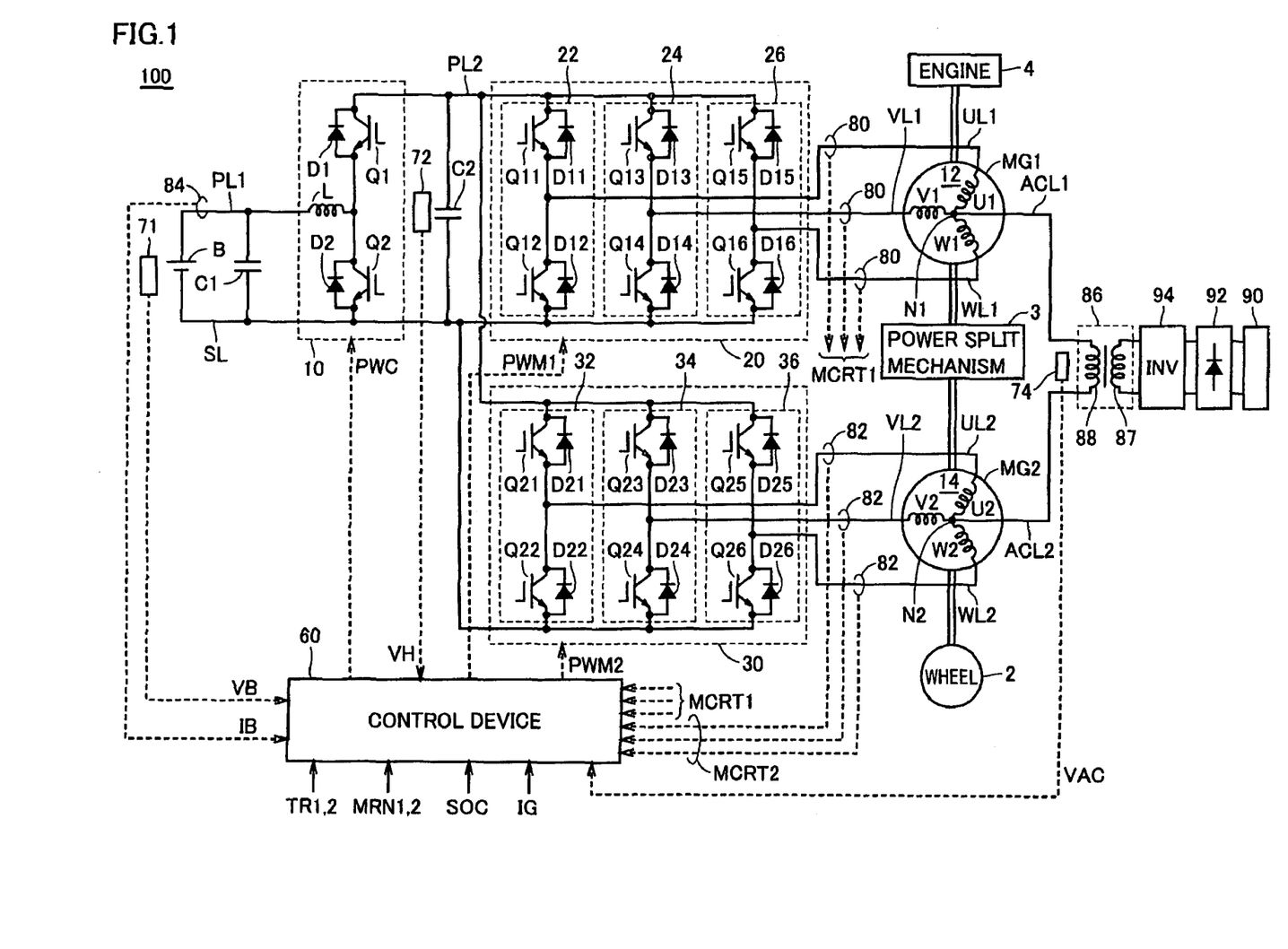
FIG. 1 is an entire block diagram of a hybrid vehicle presented as an example of an electrically driven vehicle according to an embodiment of the present invention.

FIG. 1 is an entire block diagram of a hybrid vehicle presented as an example of an electrically driven vehicle according to an embodiment of the present invention. Referring to FIG. 1, a hybrid vehicle 100 includes an electricity storage device B, a boost converter 10, inverters 20 and 30, motor generators MG1 and MG2, an engine 4, a power split mechanism 3, a wheel 2, and a control device 60.

Hybrid vehicle 100 also includes an input terminal 90, a rectifier 92, an inverter 94, a transformer 86, and AC lines ACL1 and ACL2. Furthermore, hybrid vehicle 100 includes power supply lines PL1 and PL2, a ground line SL, capacitors C1 and C2, U-phase lines UL1-UL3, V-phase lines VL1-VL3, W-phase lines WL1-WL3, voltage sensors 71, 72 and 74, and current sensors 80, 82 and 84.

Power split mechanism 3 is linked to engine 4 and motor generators MG1 and MG2 to split the power therebetween. For example, a planetary gear mechanism including three rotational shafts of a sun gear, planetary carrier, and ring gear can be employed as power split mechanism 3. The three rotational shafts are connected to each rotational shaft of engine 4 and motor generators MG1 and MG2. For example, by passing the crankshaft of engine 4 through the center of the hollow rotor of motor generator MG1, engine 4 and motor generators MG1 and MG2 can be connected mechanically to power split mechanism 3.

The rotational shaft of motor generator MG2 is linked to wheel 2 by a reduction gear and/or actuating operation gear not shown. Further, a reduction gear for the rotational shaft of motor generator MG2 can be incorporated in power split mechanism 3.

Motor generator MG1 is incorporated in hybrid vehicle 100, operating as a power generator driven by engine 4, and as electric motor capable of startup of engine 4. Motor generator MG2 is incorporated in hybrid vehicle 100 as an electric motor that drives driving wheel 2 qualified as a driven wheel.

Electricity storage device B has a positive electrode connected to power supply line PL1 and a negative electrode connected to ground line SL. Capacitor C1 is connected between power supply line PL1 and ground line SL.

Boost converter 10 includes a reactor L, npn transistors Q1 and Q2, and anti-parallel diodes D1 and D2. NPN transistors Q1 and Q2 are connected in series between power supply line PL2 and ground line SL. Between the collector and emitter of npn transistors Q1 and Q2 is connected anti-parallel diodes D1 and D2, respectively, so as to conduct a current flow from the emitter side to the collector side. Reactor L has one end connected to the connection node of npn transistors Q1 and Q2 and the other end connected to power supply line PL1.

For the npn transistor set forth above and described hereinafter in the present description, an IGBT (Insulated Gate Bipolar Transistor), for example, can be employed. Further, a power switching element such as a power MOSFET (Metal Oxide Semiconductor Field-Effect Transistor) can be employed instead of an npn transistor.

Capacitor C2 is connected between power supply line PL2 and ground line SL. Inverter 20 includes a U-phase arm 22, a V-phase arm 24 and a W-phase arm 26. U-phase arm 22, V-phase arm 24 and W-phase arm 26 are connected in parallel between power supply line PL2 and ground line SL. U-phase arm 22 is formed of npn transistors Q11 and Q12 connected in series. V-phase arm 24 is formed of npn transistors Q13 and Q14 connected in series. W-phase arm 26 is formed of npn transistors Q15 and Q16 connected in series. Between the collector and emitter of npn transistors Q11-Q16 are connected anti-parallel diodes D11-D16, respectively, conducting a current flow from the emitter side to the collector side.

Motor generator MG1 includes a 3-phase coil 12 as the stator coil. U-phase coil U1, V-phase coil V1 and W-phase coil W1 constituting 3-phase coil 12 have one ends connected to each other to form a neutral point N1, and the other ends connected to the connection nodes of respective npn transistors of U-phase arm 22, V-phase arm 24 and W-phase arm 26 of inverter 20.

Inverter 30 includes a U-phase arm 32, a V-phase arm 34 and a W-phase arm 36. Motor generator MG2 includes a 3-phase coil 14 as the stator coil. The configurations of inverter 30 and motor generator MG2 are similar to those of inverter 20 and motor generator MG1, respectively.

Transformer 86 includes a primary coil 87 and a secondary coil 88. Secondary coil 88 is connected to neutral points N1 and N2 of 3-phase coils 12 and 14 of motor generators MG1 and MG2 via AC lines ACL1 and ACL2, respectively. Primary coil 87 is connected to inverter 94. Rectifier 92 is connected at the primary side of inverter 94. Input terminal 90 is connected at the primary side of rectifier 92.

Electricity storage device B is a rechargeable DC power supply such as a nickel-hydrogen or lithium-ion secondary battery. Electricity storage device B provides DC power to boost converter 10. Electricity storage device B is charged by boost converter 10. A capacitor of large capacitance can be employed for electricity storage device B.

Voltage sensor 71 detects voltage VB of electricity storage device B to provide the detected voltage VB to control device 60. Current sensor 84 detects current IB input/output with respect to electricity storage device B to provide the detected current IB to control device 60. Capacitor C1 smoothes the voltage variation between power supply line PL1 and ground line SL.

Boost converter 10 responds to a signal PWC from control device 60 to boost the DC voltage from electricity storage device B using reactor L and provides the boosted voltage onto power supply line PL2. Specifically, based on signal PWC from control device 60, boost converter 10 accumulates the flowing current in response to the switching operation of npn transistor Q2 as magnetic field energy at reactor L to boost the DC voltage from electricity storage device B. Boost converter 10 outputs the boosted voltage onto power supply line PL2 via anti-parallel diode D1 in synchronization with the OFF-timing of npn transistor Q2. When charging of electricity storage device B is effected from a commercial power supply external to the vehicle and connected to input terminal 90, boost converter 10 controls the charging current of electricity storage device B based on signal PWC from control device 60.

Capacitor C2 smoothes the voltage variation between power supply line PL2 and ground line SL. Voltage sensor 72 detects the voltage across the terminals of capacitor C2, i.e. voltage VH on power supply line PL2 with respect to ground line SL, and provides the detected voltage VH to control device 60.

Based on a signal PWM1 from control device 60, inverter 20 converts the DC voltage from power supply line PL2 into 3-phase AC voltage, which is provided to motor generator MG1. Accordingly, motor generator MG1 is driven to generate the specified torque. Inverter 20 converts the 3-phase AC voltage generated by motor generator MG1 upon receiving the output of engine 4 into DC voltage based on signal PWM1 from control device 60, and outputs the converted DC voltage onto power supply line PL2.

Based on a signal PWM2 from control device 60, inverter 30 converts the DC voltage from power supply line PL2 into 3-phase AC voltage, and outputs the converted 3-phase AC voltage to motor generator MG2. Accordingly, motor generator MG2 is driven to generate the specified torque. In a regenerative braking mode of the vehicle, inverter 30 converts the 3-phase AC voltage generated by motor generator MG2 upon receiving the rotational force from wheel 2 into DC voltage based on signal PWM2 from control device 60, and provides the converted DC voltage onto power supply line PL2.

As used herein, "regenerative braking" includes the braking operation with the regenerative power generation when the driver of the hybrid vehicle depresses the foot brake, or reducing the speed (or ceasing acceleration) of the vehicle during regenerative power generation by turning off the accelerator pedal during driving without operating the foot brake.

When charging of electricity storage device B is effected from a commercial power supply connected to input terminal 90, inverters 20 and 30 rectify AC voltage boosted and applied to neutral points N1 and N2 of 3-phase coils 12 and 14 by transformer 86 for output onto power supply line PL2. When electricity storage device B is to be charged from a commercial power supply, npn transistors Q11-Q16 and Q21-Q26 of inverters 20 and 30 are all turned off (gate shut down), and rectification is conducted by anti-parallel diodes D11-D16 and D21-D26.

Motor generators MG1 and MG2 are 3-phase AC electric motors, and constituted of, for example, 3-phase alternating synchronous electric motors. Motor generator MG1 employs the output of engine 4 to generate 3-phase AC voltage, which is output to inverter 20. Motor generator MG1 generates driving power by the 3-phase AC voltage from inverter 20 to start engine 4. Motor generator MG2 generates the drive torque of the vehicle by the 3-phase AC voltage received from inverter 30. In a regenerative braking mode of the vehicle, motor generator MG2 generates and outputs to inverter 30 a 3-phase AC voltage.

Transformer 86 boosts the high-frequency AC voltage from inverter 94 to a voltage level higher than voltage VB of electricity storage device B, and outputs the boosted AC voltage onto AC lines ACL1 and ACL2. Transformer 86 insulates respective elements such as inverters 20 and 30 incorporated in the vehicle from the commercial power supply connected to input terminal 90. Voltage sensor 74 detects voltage VAC between AC lines ACL1 and ACL2 and outputs the detected voltage VAC to control device 60.

Input terminal 90 serves to receive commercial AC voltage when electricity storage device B is to be charged from a commercial power supply external to the vehicle. Rectifier 92 rectifies the commercial AC voltage supplied to input terminal 90 for output to inverter 94. Inverter 94 converts the DC voltage from rectifier 92 into AC voltage of high frequency, which is output to primary coil 87 of transformer 86.

The reason why the commercial AC voltage from the commercial power supply is increased in frequency by means of rectifier 92 and inverter 94 is that the size of transformer 86 can be reduced by operating transformer 86 at high frequency.

Current sensor 80 detects motor current MCRT1 flowing to motor generator MG1 and outputs detected motor current MCRT1 to control device 60. Current sensor 82 detects motor current MCRT2 flowing to motor generator MG2 and outputs detected motor current MCRT2 to control device 60.

Control device 60 generates signal PWC to drive boost converter 10 and signals PWM1 and PWM2 to drive inverters 20 and 30, respectively. The generated signals PWC, PWM1 and PWM2 are output to boost converter 10, inverter 20, and inverter 30, respectively.

Control device 60 determines whether to charge electricity storage device B from the commercial power supply connected to input terminal 90, and when charging of electricity storage device B is to be executed, turns off all npn transistors Q11-Q16 and Q21-Q26 of inverters 20 and 30, and effects charging control of electricity storage device B by means of boost converter 10.

Figure 2:
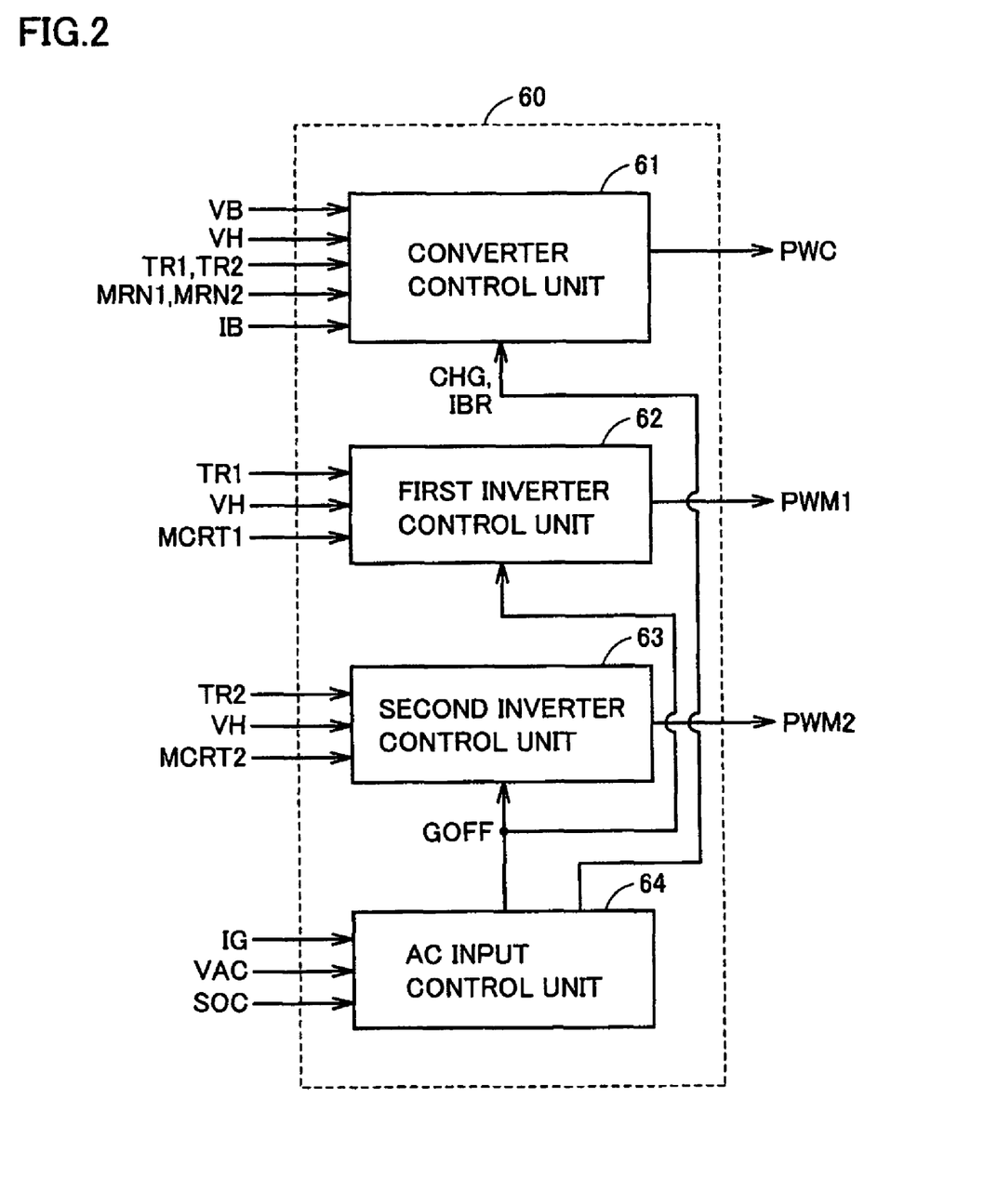
FIG. 2 is a functional block diagram of a control device shown in FIG. 1.

FIG. 2 is a functional block diagram of control device 60 of FIG. 1. Referring to FIG. 2, control device 60 includes a converter control unit 61, a first inverter control unit 62, a second inverter control unit 63, and an AC input control unit 64.

Based on voltage VB from voltage sensor 71, voltage VH from voltage sensor 72, torque command values TR1 and TR2 as well as motor speed MRN1 and MRN2 of motor generators MG1 and MG2 output from HV-ECU (not shown; the same applies hereinafter), current IB from current sensor 84, and also a charging current target value IBR and charge control command CHG from AC input control unit 64, converter control unit 61 generates a signal PWC to turn on/off npn transistors Q1 and Q2 of boost converter 10 to provide the generated signal PWC to boost converter 10.

Based on torque command value TR1 and motor current MCRT1 of motor generator MG1 and voltage VH, first inverter control unit 62 generates a signal PWM1 to turn on/off npn transistors Q11-Q16 of inverter 20 to provide the generated signal PWM1 to inverter 20. Upon receiving a gate off command GOFF from AC input control unit 64, first inverter control unit 62 generates and provides to inverter 20 signal PWM1 to turn off all npn transistors Q11-Q16 of inverter 20.

Based on torque command value TR2 and motor current MCRT2 of motor generator MG2 and voltage VH, second inverter control unit 63 generates signal PWM2 to turn on/off npn transistors Q21-Q26 of inverter 30. The generated signal PWM2 is output to inverter 30. Upon receiving gate off command GOFF from AC input control unit 64, second inverter control unit 63 generates and provides to inverter 30 signal PWM2 to turn off all npn transistors Q21-Q26 of inverter 30.

Based on a signal IG from an ignition key (or ignition switch; the same applies hereinafter) not shown and voltage VAC from voltage sensor 74, AC input control unit 64 determines whether to effect charging of electricity storage device B from the commercial power supply external to the vehicle. During execution of charging of electricity storage device B, AC input control unit 64 outputs gate off command GOFF to first and second inverter control units 62 and 63, and outputs charge control command CHG to converter control unit 61. Charge control command CHG is a command to instruct converter control unit 61 to effect charge control of electricity storage device B.

When charging of electricity storage device B is executed, AC input control unit 64 calculates a charging current target value IBR of electricity storage device B based on the state of charge (SOC) of electricity storage device B received from HV-ECU, and provides the calculated charging current target value IBR to converter control unit 61. The SOC of electricity storage device B is calculated based on the well-known scheme by a battery ECU not shown.

Figure 3:
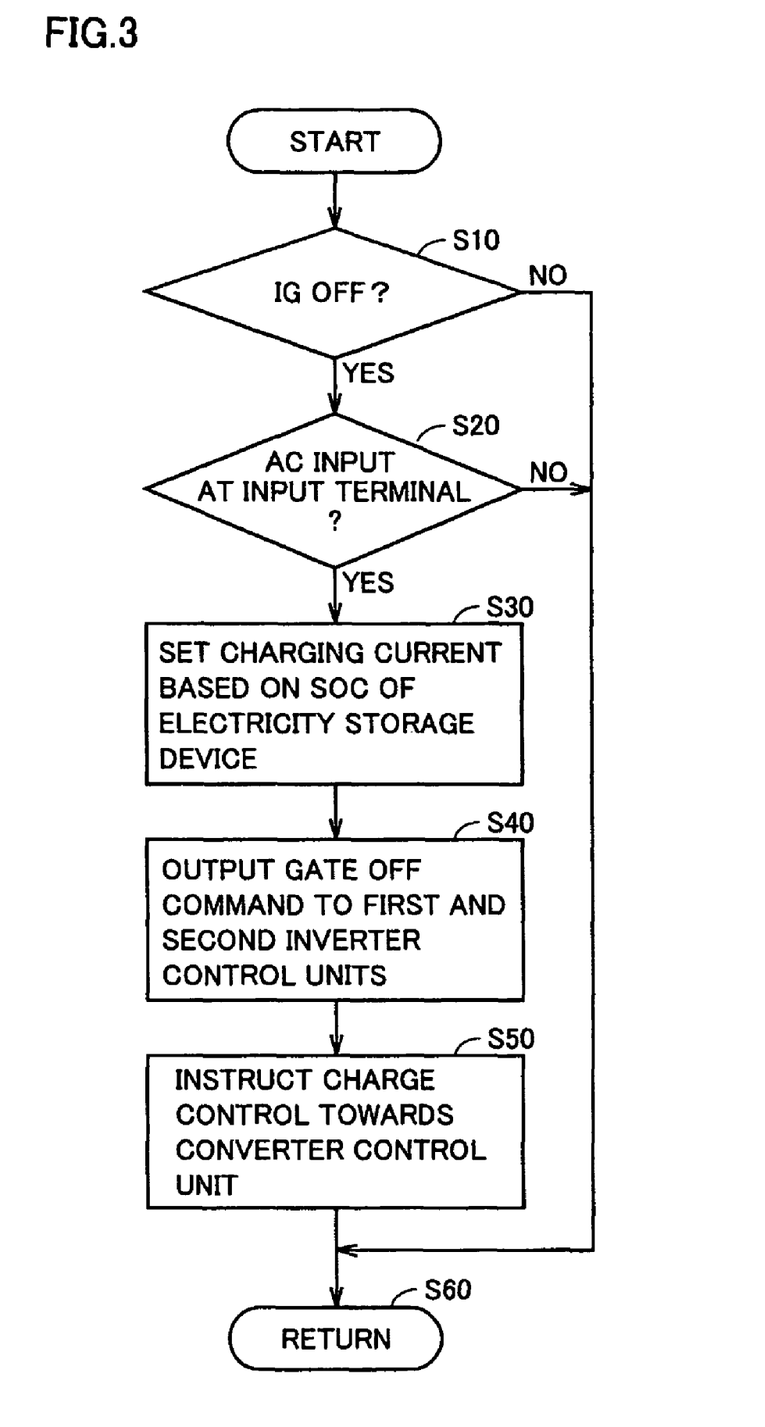
FIG. 3 is a flow chart of a control configuration of a program related to determination of charging execution of the electricity storage device by an AC input control unit shown in FIG. 2.

FIG. 3 is a flowchart of a control configuration of a program related to determination of charge execution of electricity storage device B by AC input control unit 64 shown in FIG. 2. The process of this flowchart is invoked and executed from the main routine at a constant time interval or every time a predetermined condition is established.

Referring to FIG. 3, AC input control unit 64 determines whether the ignition key has been turned to the OFF position based on signal IG from the ignition key (step S10). Upon determination that the ignition key is not at the OFF position (NO at step S10), AC input control unit 64 determines that it is inappropriate to connect the commercial power supply to input terminal 90 for charging of electricity storage device B, and control proceeds to step S60. Control is transferred to the main routine.

When determination is made that the ignition key corresponds to the OFF position at step S10 (YES at step S10), AC input control unit 64 determines whether commercial AC voltage from the commercial power supply is applied to input terminal 90 based on voltage VAC from voltage sensor 74 (step S20). Upon determination that the commercial AC voltage is not input (NO at step S20), AC input control unit 64 does not effect the charging process, and control proceeds to step S60. Thus, control returns to the main routine.

When input of commercial AC voltage to input terminal 90 is confirmed (YES at step S20), AC input control unit 64 calculates charging current target value IBR of electricity storage device B based on the SOC of electricity storage device B. The calculated charging current target value IBR is output to converter control unit 61 (step S30). For example, when the SOC of electricity storage device B is lower than the reference value corresponding to a sufficient SOC of electricity storage device B, AC input control unit 64 sets charging current target value IBR of electricity storage device B at a predetermined value. The value of charging current target value IBR may be varied according to the SOC of electricity storage device B.

When the charging current of electricity storage device B is set at step S30, AC input control unit 64 outputs gate off command GOFF to first and second inverter control units 62 and 63 (step S40). In response, first and second inverter control units 62 and 63 turn off all npn transistors Q11-Q16 and Q21-Q26 in inverters 20 and 30, respectively. Switching of inverters 20 and 30 is suppressed during charging of electricity storage device B from the commercial power supply connected to input terminal 90.

Following the process of step S40, AC input control unit 64 outputs charge control command CHG to converter control unit 61 to instruct converter control unit 61 to execute charge control of electricity storage device B (step S50). Accordingly, converter control unit 61 executes charging control of electricity storage device B, as will be described afterwards. During charging of electricity storage device B, boost converter 10 charges electricity storage device B while controlling the charging current of electricity storage device B at the level of charging current target value IBR. Then, control returns to the main routine (step S60).

Figure 4:
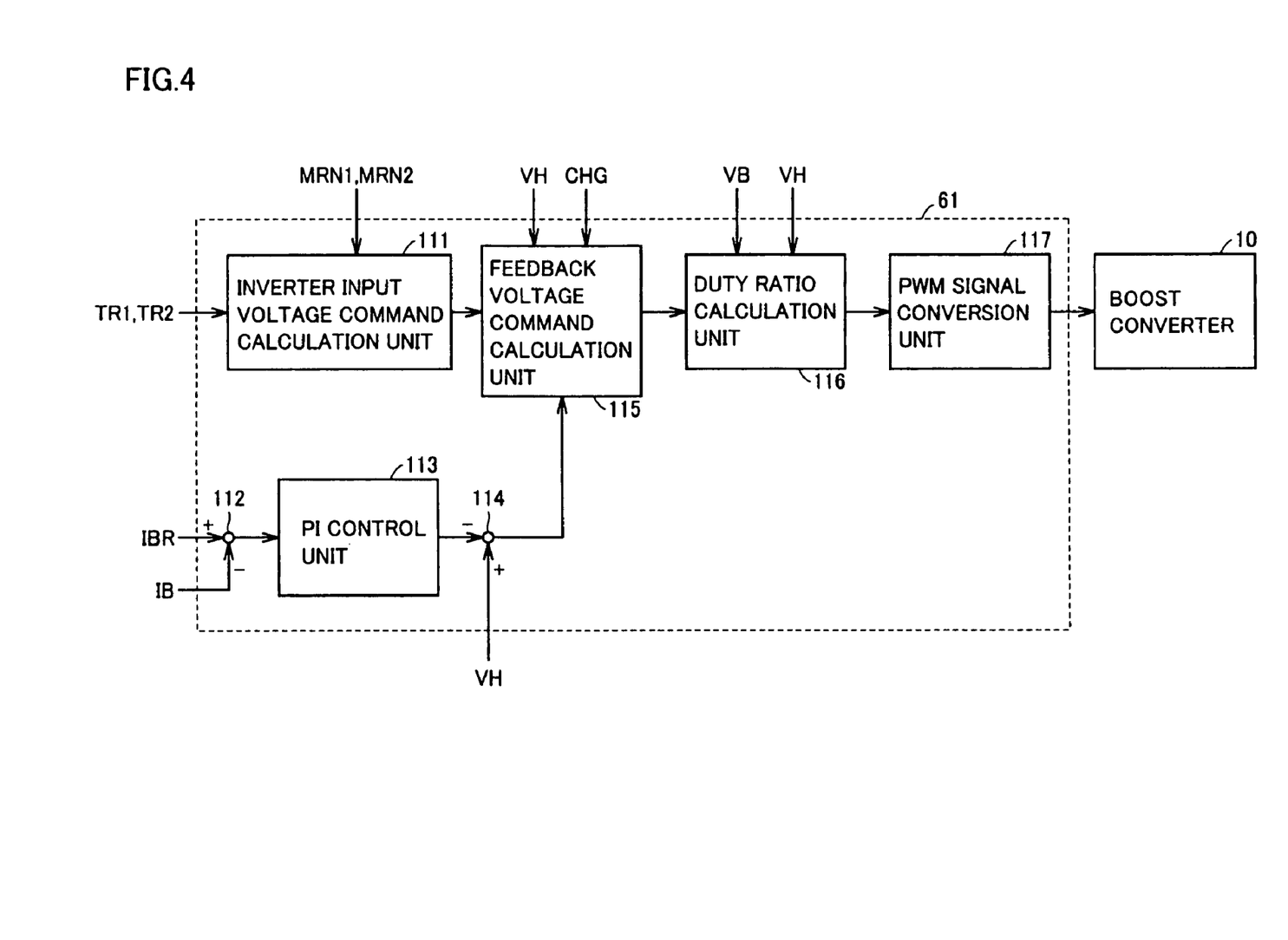
FIG. 4 is a functional block diagram of a converter control unit shown in FIG. 2.

FIG. 4 is a functional block diagram of converter control unit 61 of FIG. 2. Referring to FIG. 4, converter control unit 61 includes an inverter input voltage command calculation unit 111, subtracters 112 and 114, a PI control unit 113, a feedback voltage command calculation unit 115, a duty ratio calculation unit 116, and a PWM signal conversion unit 117.

Inverter input voltage command calculation unit 111 calculates the optimum value (target value) of the inverter input voltage, i.e. voltage command VH_com, based on torque command values TR1 and TR2 and motor speed MRN1 and MRN2 from HV-ECU. The calculated voltage command VH_com is output to feedback voltage command calculation unit 115.

Subtracter 112 receives charging current target value IBR from AC input control unit 64 and current IB from current sensor 84 to subtract current IB from charging current target value IBR. The calculated result is output to PI control unit 113.

PI control unit 113 carries out a proportional and integral operation with the deviation between charging current target value IBR and current IB received from subtracter 112 as the input. The calculated result is output to subtracter 114.

Subtracter 114 receives the output value of PI control unit 113 and voltage VH from voltage sensor 72 to subtract the output value of PI control unit 113 from voltage VH. The calculated result is output to feedback voltage command calculation unit 115 as voltage command VH_IB.

Feedback voltage command calculation unit 115 receives voltage VH, charge control command CHG from AC input control unit 64, voltage command VH_com from inverter input voltage command calculation unit 111, and voltage command VH_IB from subtracter 114. When charge control command CHG is inactive, feedback voltage command calculation unit 115 calculates feedback voltage command VH_fb to control voltage VH at the level of voltage command VH_com, based on voltage VH and voltage command VH_com from inverter input voltage command calculation unit 111. The calculated feedback voltage command VH_fb is output to duty ratio calculation unit 116.

When charge control command CHG is active, feedback voltage command calculation unit 115 calculates feedback voltage command VH_fb to control voltage VH at the level of voltage command VH_IB, based on voltage VH and voltage command VH_IB from subtracter 114. The calculated feedback voltage command VH_fb is output to duty ratio calculation unit 116.

Based on voltage VB from voltage sensor 71, voltage VH, and feedback voltage command VH_fb from feedback voltage command calculation unit 115, duty ratio calculation unit 116 calculates the duty ratio to control voltage VH at the level of voltage command VH_com or VH_IB. The calculated duty ratio is output to PWM signal conversion unit 117.

Based on duty ratio from duty ratio calculation unit 116, PWM signal conversion unit 117 generates a PWM (Pulse Width Modulation) signal to turn on/off npn transistors Q1 and Q2 of boost converter 10. The generated PWM signal is output to npn transistors Q1 and Q2 of boost converter 10 as signal PWC.

When charge control command CHG from AC input control unit 64 is inactive, i.e. when charging of electricity storage device B from the commercial power supply is not executed, converter control unit 61 controls the switching duty of the upper arm and lower arm of boost converter 10 such that voltage VH is controlled at the level of voltage command VH_com calculated by inverter input voltage command calculation unit 111.

In contrast, when charge control command CHG from AC input control unit 64 is active, i.e. charging of electricity storage device B from the commercial power supply is executed, the switching duty of the upper arm and lower arm of boost converter 10 is controlled such that charging current IB of electricity storage device B is controlled at the level of charging current target value IBR.

Figure 5:
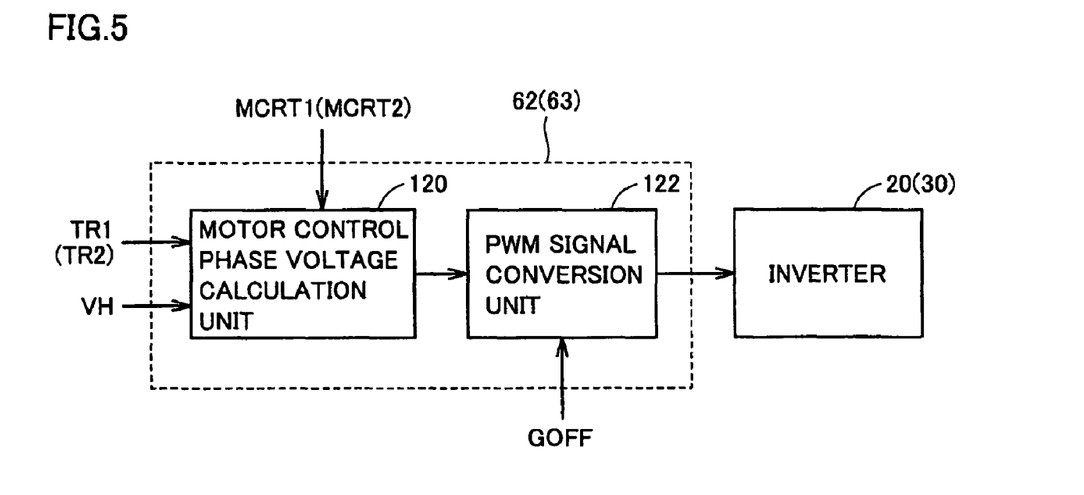
FIG. 5 is a functional block diagram of first and second inverter control units shown in FIG. 2.

FIG. 5 is a functional block diagram of first and second inverter control units 62 and 63 of FIG. 2. Referring to FIG. 5, each of first and second inverter control units 62 and 63 includes a phase voltage calculation unit 120 for motor control and a PWM signal conversion unit 122.

Motor control phase voltage calculation unit 120 receives from voltage sensor 72 a voltage VH that is the input voltage of inverters 20 and 30, receives motor current MCRT1 (or MCRT2) flowing through each phase of motor generator MG1 (or MG2) from current sensor 80 (or 82), and receives torque command value TR1 (or TR2) from HV-ECU. Motor control phase voltage calculation unit 120 calculates the voltage to be applied to each phase coil of motor generator MG1 (or MG2) based on the input values. The calculated voltage of each phase coil is output to PWM signal conversion unit 122.

When gate off command GOFF from AC input control unit 64 is inactive, PWM signal conversion unit 122 responds to the voltage command of each phase coil received from motor control phase voltage calculation unit 120 to generate a signal PWM1_0 (one type of signal PWM1) (or signal PWM2_0 (one type of signal PWM2)) that turns on/off each of npn transistors Q11-Q16 (or Q21-Q26) of inverter 20 (or 30). The generated signal PWM1_0 (or PWM2_0) is output to each of npn transistors Q11-Q16 (or Q21-Q26) of inverter 20 (or 30).

Thus, each of npn transistors Q11-Q16 (or Q21-Q26) is switching-controlled, and the current to be conducted to each phase of motor generator MG1 (or MG2) is regulated such that motor generator MG1 (or MG2) outputs the specified torque. As a result, motor torque corresponding to torque command value TR1 (or TR2) is output.

When gate off command GOFF from AC input control unit 64 is active, PWM signal conversion unit 122 generates a signal PWM1_1 (one type of signal PWM1) (or signal PWM2_1 (one type of signal PWM2)) that turns off all of npn transistors Q11-Q16 (or Q21-Q26) of inverter 20 (or 30), irrespective of the output of motor control phase voltage calculation unit 120. The generated signal PWM1_1 (or PWM2_1) is output to npn transistors Q11-Q16 (or Q21-Q26) of inverter 20 (or 30).

Referring to FIG. 1 again, the entire operation of hybrid vehicle 100 will be described. This hybrid vehicle 100 runs with engine 4 and motor generator MG2 as the motive power source. Electric power is generated by motor generator MG1 using the output of engine 4 to supply the electric power to electricity storage device B. In a regenerative braking mode of the vehicle, regenerative power generation is conducted by motor generator MG2 using the rotation force of motor generator MG2 to supply electric power to electricity storage device B.

At hybrid vehicle 100, electricity storage device B can be charged using the commercial power supply connected to input terminal 90. The commercial AC voltage applied to input terminal 90 is converted into AC voltage of high frequency by rectifier 92 and inverter 94 to be applied to transformer 86.

Transformer 86 boosts the high-frequency AC voltage from inverter 94 to a voltage level higher than the level of voltage VB of electricity storage device B. The boosted AC voltage is output to neutral points N1 and N2 of 3-phase coils 12 and 14 of motor generators MG1 and MG2 via AC lines ACL1 and ACL2. The AC voltage applied to neutral points N1 and N2 is rectified by inverters 20 and 30 to be output onto power supply line PL2.

When charging of electricity storage device B is effected from the commercial power supply, each of npn transistors Q11-Q16 and Q21-Q26 of inverters 20 and 30 are all turned off without switching. Since AC voltage applied to neutral points N1 and N2 is boosted to a voltage level higher than the voltage VB of electricity storage device B by transformer 86, anti-parallel diodes D11-D16 and D21-D26 of inverters 20 and 30 function as rectifying circuits to rectify the AC voltage applied to neutral points N1 and N2 for output onto power supply line PL2.

Control device 60 sets the charging current of electricity storage device B based on the SOC of electricity storage device B. Boost converter 10 responds to signal PWC from control device 60 to charge electricity storage device B while controlling the charging current from power supply line PL2 towards electricity storage device B.

According to the present embodiment, the supply of AC power from the commercial power supply external to the vehicle to neutral points N1 and N2 of 3-phase coils 12 and 14 of motor generators MG1 and MG2 allows charging of electricity storage device B without having to provide a dedicated AC/DC converter additionally.

Since transformer 86 is provided between input terminal 90 and neutral points N1 and N2 such that the commercial AC voltage from the commercial power supply is boosted to a voltage level higher than voltage VB of electricity storage device B to be applied to neutral points N1 and N2, switching of inverters 20 and 30 is not required when electricity storage device B is charged from a commercial power supply. Therefore, switching loss at inverters 20 and 30 can be eliminated, allowing reduction of the loss in charging. Further, insulation of devices such as motor generators MG1 and MG2 and inverters 20 and 30 from the commercial power supply can be ensured.

The path from input terminal 90 to primary coil 87 of transformer 86 may be provided external to the hybrid vehicle.

Figure 6:
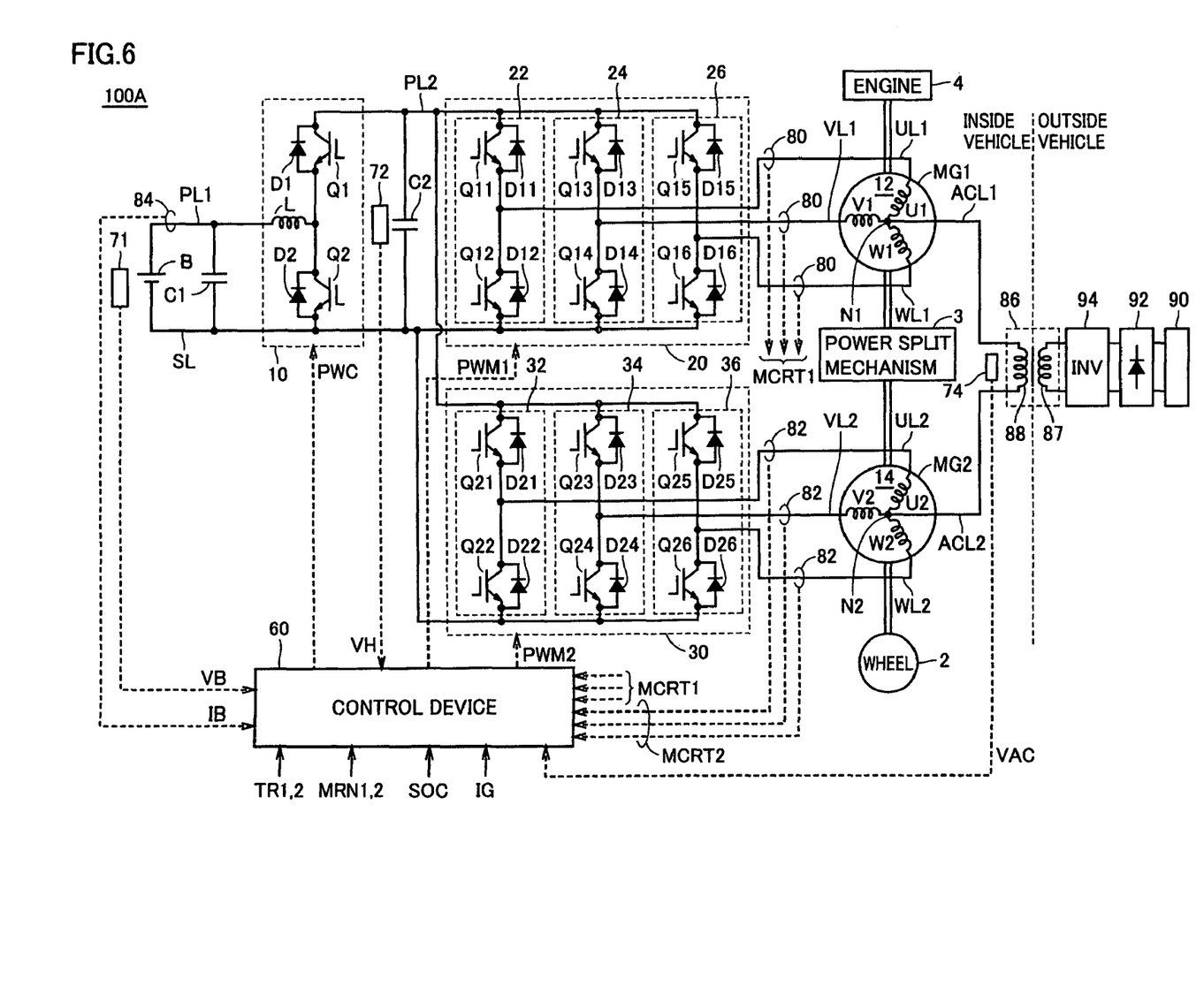
FIG. 6 is an entire block diagram of a hybrid vehicle according to a modification of an embodiment of the present invention.

FIG. 6 is an entire block diagram of a hybrid vehicle according to a modification of the embodiment of the present invention. Referring to FIG. 6, a hybrid vehicle 100A includes secondary coil 88 of transformer 86. Primary coil 87 of transformer 86, input terminal 90, rectifier 92, and inverter 94 are provided external to hybrid vehicle 100A.

Primary coil 87 of transformer 86, input terminal 90, rectifier 92 and inverter 94 are constituted as the charging equipment external to the vehicle. When electricity storage device B is to be charged from the commercial power supply connected to input terminal 90, primary coil 87 is set in the proximity of secondary coil 88 incorporated in hybrid vehicle 100A to allow boosting of commercial AC voltage from the commercial power supply for application to neutral points N1 and N2.

According to hybrid vehicle 100A, charging is allowed with respect to hybrid vehicle 100A in a non-contact manner when electricity storage device B is charged from a commercial power supply. Further, since primary coil 87 of transformer 86, input terminal 90, rectifier 92 and inverter 94 are provided external to the vehicle, the weight of hybrid vehicle 100A can be reduced as compared to hybrid vehicle 100 set forth above.

Although the embodiment set forth above includes rectifier 92 and inverter 94 between input terminal 90 and transformer 86 in order to reduce the size of transformer 86, the present invention is applicable even if rectifier 92 and inverter 94 are absent.

Although a hybrid vehicle has been described as an example of an electrically driven vehicle of the present invention in the embodiment set forth above, the present invention is also applicable to an electric vehicle as well as a fuel cell vehicle incorporating an electricity storage device such as a battery or capacitor in addition to a fuel cell.

In the description set forth above, 3-phase coils 12 and 14 correspond to "first polyphase winding" and "second polyphase winding", respectively, of the present invention. Inverters 20 and 30 correspond to "first inverter" and "second inverter", respectively, of the present invention. Boost converter 10 and transformer 86 correspond to "converter" and "boosting device", respectively, of the present invention. Further, motor generators MG1 and MG2 correspond to "first electric motor" and "second electric motor", respectively, of the present invention.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A charge control device to charge an electricity storage device (B), comprising:
   a first polyphase winding (12) that is star-connected,
   a second polyphase winding (14) that is star-connected,
   first and second inverters (20, 30) connected to said first and second polyphase windings (12, 14), respectively, and including an anti-parallel diode (D11-D16, D21-D26) connected in parallel with each switching element (Q11-Q16, Q21-Q26),
   a converter (10) arranged between each of said first and second inverters (20, 30) and said electricity storage device (B), and
   a boosting device (86) arranged between each of a first neutral point (N1) of said first polyphase winding (12) and a second neutral point (N2) of said second polyphase winding (14) and a power supply, boosting voltage supplied from said power supply to a voltage level higher than the voltage of said electricity storage device (B) to provide the boosted voltage to said first and second neutral points (N1, N2), wherein
   said first and second inverters (20, 30) output the voltage boosted and applied to said first and second neutral points (N1, N2) by said boosting device (86) to said converter (10) via said anti-parallel diode (D11-D16, D21-D26),
   said converter (10) receives voltage output from said first and second inverters (20, 30) to charge said electricity storage device (B).

2. The charge control device according to claim 1, wherein
the voltage supplied from said power supply is AC voltage,
said boosting device (86) includes a transformer boosting the AC voltage supplied from said power supply, and
said first and second inverters (20, 30) use said anti-parallel diode (D11-D16, D21-D26) to rectify the AC voltage boosted and applied to said first and second neutral points (N1, N2) by said transformer for output to said converter (10).

3. The charge control device according to claim 2, wherein said power supply is an AC power supply for commercial use.

4. The charge control device according to claim 2, wherein
said first and second polyphase windings (12, 14) are included in first and second electric motors (MG1, MG2) as stator windings, respectively, and
said first and second electric motors (MG1, MG2), said electricity storage device (B), said converter (10), said first and second inverters (20, 30), and a secondary winding (88) of said transformer are incorporated in an electrically driven vehicle with at least one of said first and second electric motors (MG1, MG2) as a motive power source.

5. An electrically driven vehicle comprising:
an electricity storage device (B),
a first electric motor (MG1) including a first polyphase winding (12) that is star-connected as a stator winding,
a second electric motor (MG2) including a second polyphase winding (14) that is star-connected as a stator winding,
first and second inverters (20, 30) provided corresponding to said first and second electric motors (MG1, MG2), respectively, and including an anti-parallel diode (D11-D16, D21-D26) connected in parallel with each switching element (Q11-Q16, Q21-Q26),
a converter (10) arranged between each of said first and second inverters (20, 30) and said electricity storage device (B), and
a boosting device (86) arranged between each of a first neutral point (N1) of said first polyphase winding (12) and a second neutral point (N2) of said second polyphase winding (14) and a power supply external to the vehicle, boosting voltage supplied from said power supply to a voltage level higher than the voltage of said electricity storage device (B) to provide the boosted voltage to said first and second neutral points (N1, N2), wherein
when charging of said electricity storage device (B) is effected from said power supply,
said first and second inverters (20, 30) output the voltage boosted and applied to said first and second neutral points (N1, N2) by said boosting device (86) to said converter (10) via said anti-parallel diode (D11-D16, D21-D26),
said converter (10) receives voltage output from said first and second inverters (20, 30) to charge said electricity storage device (B).

6. The electrically driven vehicle according to claim 5, wherein the voltage supplied from said power supply is AC voltage,
said boosting device (86) includes a transformer boosting the AC voltage supplied from said power supply, and
said first and second inverters (20, 30) use said anti-parallel diode (D11-D16, D21-D26) to rectify the AC voltage boosted and applied to said first and second neutral points (N1, N2) by said transformer for output to said converter (10).

7. The electrically driven vehicle according to claim 6, wherein said power supply is an AC power supply for commercial use.

8. The charge control device according to claim 1, wherein said converter (10) charges said electricity storage device (B) while controlling charging current of said electricity storage device (B) based on a state of charge of said electricity storage device (B).

9. The electrically driven vehicle according to claim 5, wherein said converter (10) charges said electricity storage device (B) while controlling charging current of said electricity storage device (B) based on a state of charge of said electricity storage device (B).

* * * * *